United States Patent
Lee et al.

(10) Patent No.: US 6,899,937 B2
(45) Date of Patent: *May 31, 2005

(54) OPTICAL DISC

(75) Inventors: Yong-Hoon Lee, Suwon (KR);
Chul-Woo Lee, Sungnam (KR);
Chong-Sam Chung, Sungnam (KR);
Kun-Ho Cho, Suwon (KR)

(73) Assignee: Samsung Electronics Co., Ltd., Suwon-Si (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/513,687

(22) Filed: Feb. 25, 2000

(65) Prior Publication Data

US 2003/0026935 A1 Feb. 6, 2003

(30) Foreign Application Priority Data

Apr. 16, 1999 (KR) ............................................. 99-13453

(51) Int. Cl.[7] .............................. B32B 3/02; G11B 7/24
(52) U.S. Cl. .................... 428/64.4; 428/64.1; 428/64.6; 428/64.9; 369/275.3; 369/275.4
(58) Field of Search ............................... 428/64.1, 64.4, 428/64.6, 64.9; 369/275.3, 275.4

(56) References Cited

U.S. PATENT DOCUMENTS

| 5,016,240 | A | * | 5/1991 | Strandjord et al. | ......... 369/288 |
| 5,425,008 | A | * | 6/1995 | Ohta et al. | ............... 369/13.35 |
| 5,470,627 | A | | 11/1995 | Lee et al. | ..................... 428/64 |
| 5,776,574 | A | | 7/1998 | Honguh et al. | ............... 428/64 |

FOREIGN PATENT DOCUMENTS

EP 0 628 958 A1 12/1994

* cited by examiner

Primary Examiner—Bruce H. Hess
Assistant Examiner—Lawrence Ferguson
(74) Attorney, Agent, or Firm—Stein, McEwen & Bui, LLP

(57) ABSTRACT

An optical disc includes a substrate having micro-embossments, in which flat portions referred to as lands, and track guides, referred to as hills, and which protrude from the surfaces of the flat portions are formed. A reflective layer is formed on the substrate, a dielectric layer is formed on the reflective layer, a recording layer is formed on the dielectric layer, and a protective layer is formed on the recording layer. Thus, the lands and hills on the substrate of the optical disc enable disc fabrication to more easily facilitate manufacturing of the optical disc. Accordingly, tracks of the disc can be narrowed, to thereby enhance a recording density of the optical disc.

30 Claims, 2 Drawing Sheets

OPTICAL DISC

CROSS-REFERENCE TO RELATED APPLICATIONS

This application claims the benefit of Korean Application No. 99-13453, filed Apr. 16, 1999, in the Korean Patent Office, the disclosure of which is incorporated herein by reference.

BACKGROUND OF THE INVENTION

1. Field of the Invention

The present invention relates to an optical disc, and more particularly, to an optical disc having an enhanced recording density, and fabrication of the optical disc is facilitated and tracks are narrowed.

2. Description of the Related Art

In general, a near field recording drive is used for recording data on a disc or reproducing data from the disc in which an optical spot focused on the disc forms a near field. In the near field recording drive, a light flying head and a disc are spaced from each other by a predetermined interval, in order to record, reproduce and erase the data with respect to the disc to which a near field is formed. This technology is disclosed in detail in U.S. Pat. No. 5,470,627, which will be briefly described below with reference to FIG. 1.

FIG. 1 is a view for explaining a general near field recording drive. The FIG. 1 apparatus shows a state where a light flying head supported in a suspension 12 of a swing arm 10 is floated from the surface of an optical disc 40. The light flying head includes an objective lens 30 and a slider 31 mounting the objective lens 30 thereon, and a magnetic coil (not shown). A prism 20 with reflective surfaces 21 are positioned at an end of the light flying head. The optical disc 40 of FIG. 1 is a double-sided recording disc, in which two sheets of discs each having a one-sided recording surface are assembled with each other. The disc 40 has grooves 50 and lands 60 formed on the top and bottom surfaces of a substrate 45.

A recording/reproducing operation of the FIG. 1 apparatus will be described. In the FIG. 1 apparatus, the slider 31 rests in a parking zone (not shown) toward the inner diameter of the optical disc 40 when recording and reproducing operations are not performed. At the recording and reproducing times, the slider 31 is floated from the parking zone and moves to a data region of the optical disc 40, in order to perform the recording and reproducing operations. The reflective surfaces 21 reflect laser light 11 from a light source (not shown) and the objective lens 30 refracts laser light 11 emitted from a light source (not shown) and emits the laser light toward the optical disc 40. The light emitted from the objective lens 30 is focused in the form of an optical spot on the optical disc 40.

A near field is formed between the surface of the objective lens 30 on which the laser light 11 is focused and the optical disc 40. As a result, information is recorded on the optical disc 40 and read out from the optical disc 40 via the near field. That is, the light focused on the surface of the optical disc 40 becomes a heat source, to heat a recording layer of the optical disc 40 higher than a predetermined temperature. If a current flows through a magnetic coil during heating to thereby generate a constant magnetic field, the vertical component of the magnetic field forms a vertical magnetic sphere on a recording layer of the disc, to thereby perform a data recording. When the recorded data is reproduced, the light flying head irradiates laser light toward the surface of the optical disc 40 on the vertical magnetic sphere and reads data according to a deflection direction of the laser light reflected from the surface of the optical disc 40. That is, the reflective light reflected from the reflective layer coated on the surface of the optical disc 40 is incident to the objective lens 30. The tracking during recording and reproducing is possible as the patterns of the lands 50 and the grooves 60 formed on the substrate 45 are distinguished by the reflective layers.

A more detailed structure of the optical disc 40 used in the FIG. 1 apparatus is shown in FIG. 2. On the front and rear surfaces of the substrate 45 shown in FIG. 2 are formed grooves 50 and lands 60. On the grooves 50 and lands 60 are formed respective reflective layers 41, dielectric layers 42, recording layers 43 and protective layers 44, in sequence. In the case that pits are formed in the portion of the embossed lands 60 to perform a data recording, the grooves 50 are relatively formed in an engraved fashion. Here, the reflective layer 41 used for enhancing a reflective efficiency is coated in comparatively uniform thickness on the planar lands 60. However, the reflective layer 41 is not coated along the pattern of the grooves 50 in the narrowly engraved grooves 50. That is, in the case of the grooves 50, the reflective layer 41 is coated on the grooves 50 in a fashion where the former backfills the deep portion of the grooves 50, to accordingly vary the shape thereof. In the case that the dielectric layer 42, the recording layer 43 and the protective layer 44 as well as the reflective layer 41 are deposited in sequence, the grooves 50 are also deformed in a manner where deep portions are backfilled. Referring to FIG. 2, when the reflective layer 41, the dielectric layer 42, the recording layer 43 and the protective layer 44 are deposited on the substrate 45 having the grooves 50 thereon, it can be seen that the depths and the widths of the grooves 50 are deformed gradually.

As described above, since four or more layers are deposited on the substrate on which the grooves are formed in the optical disc, the grooves are backfilled with sputtering particles. As a result, a signal detected by a light flying head is feeble. Meanwhile, there is a method for equaling the groove width and deepening and narrowing the groove depth so that the signal detected by the light flying head becomes greater. However, this method makes disc fabrication difficult since a stamper for fabricating a basic form of a substrate should be fabricated in the form of an inverse V-shape.

SUMMARY OF THE INVENTION

To solve the above and other problems, it is an object of the present invention to provide an optical disc for use in a narrow track pitch in which a groove deformation is prevented at the time of a multilayer formation and fabrication of a high density disc is facilitated.

Additional objects and advantages of the invention will be set forth in part in the description which follows and, in part, will be obvious from the description, or may be learned by practice of the invention.

To accomplish the above and other objects of the present invention, there is provided an optical disc comprising: a substrate having that portions and micro-embossments, which are track guides, protruding from surfaces of the flat portions; a reflective layer formed on the surfaces of the flat portions and the micro-embossments of the substrate; a dielectric layer formed on the reflective layer; a recording layer formed on the dielectric layer; and a protective layer formed on the recording layer.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE INVENTION

Figure 1:
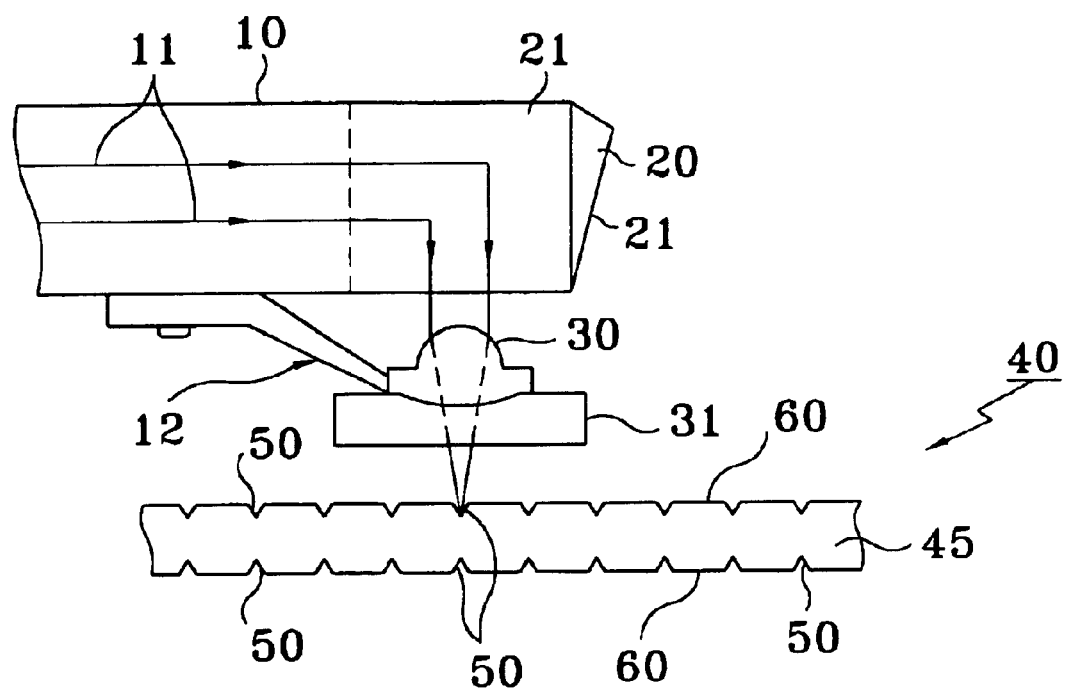
FIG. 1 is a view for explaining a general near field recording drive.
Figure 2:
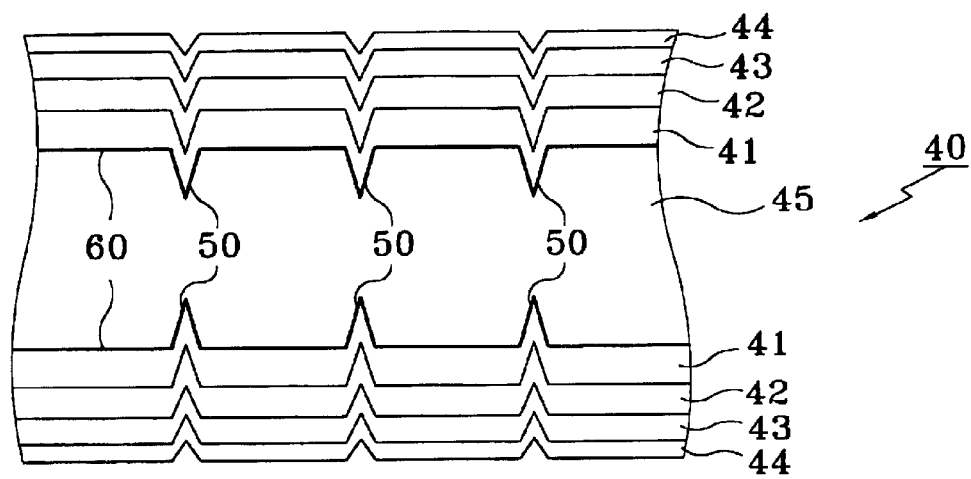
FIG. 2 is a view showing a more detailed structure of the optical disc shown in the FIG. 1 apparatus.

A preferred embodiment of the present invention will be described with reference to the accompanying drawings, wherein like reference numerals refer to like elements throughout.

Figure 3:
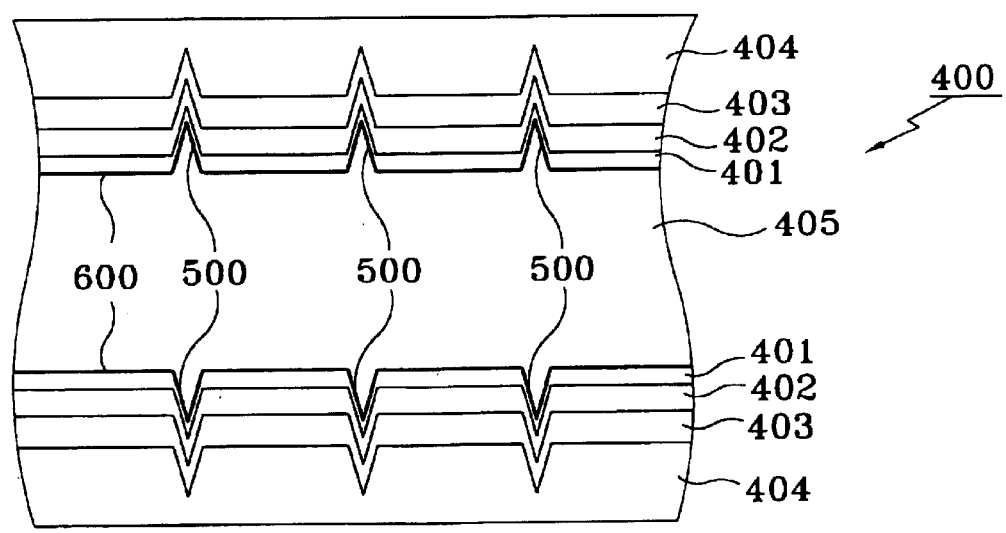
FIG. 3 is a view showing the structure of an optical disc according to an embodiment of the present invention.

FIG. 3 is a view showing a structure of an optical disc 400 according to an embodiment of the present invention. The optical disc 400 of FIG. 3 is a double-sided disc such that data is recorded on both sides and data is reproduced from both sides. The optical disc 400 includes a substrate 405, and reflective layers 401, dielectric layers 402, recording layers 403 and protective layers 404 which are respectively arranged on both sides of the substrate 405 in sequence. The optical disc 400 of FIG. 3 has a symmetrical form of the top and bottom parts centering on the substrate 405. The surfaces of the substrate 405 includes flat lands 600 and embossed hills 500 of a peaked hood shape which protrude from the surfaces of the lands 600. The optical disc shown in FIG. 3 includes flat surfaces of the lands 600 for recording data on the surfaces of the substrate 405 and the embossed hills 500 protruding from the land surfaces 600, which are used as a guide plane for tracking. Here, the hills 500 have a height of $\lambda/4$ ($\lambda$ is a wavelength of laser light 11 irradiated on the optical disc 40) from the surfaces of the lands 600, respectively.

The following description relates to each surface of the substrate 405 as there are two surfaces of the substrate 405, each having the lands 600 and the hills 500. The thin-film reflective layer 401 is formed on the surface of the substrate 405, which includes the surfaces of the lands 600 and the hills 500. On the outer surface of the reflective layer 401 are formed a dielectric layer 402 for boundary of a recording layer 403 and the recording layer 403 for recording data. Finally, a transparent protective layer 404 for protecting the recording layer 403 is formed on the recording layer 403. The thickness of the protective layer 404 is to avoid an occurrence of an unstable float of the light flying head or a stiction phenomenon, due to unevenness of the disc surface. For this purpose, the protective layer 404 is formed higher than the hills 500 embossed on the substrate 405 or a pit plane (not shown) for storing information thereon. The surface of the protective layer 404 having the above thickness maintains flatness. As described above, in the case that the hills 500 are provided as a basic pattern of the substrate 405 of the optical disc 400 shown in FIG. 3, a stamper is fabricated in the form of a successive V groove shape (a reverse shape so as to fabricate a hill shape). Therefore, disc fabrication is facilitated and disc tracks can be narrowed. Thus, a recording density can be enhanced.

A process for recording and reproducing data on and from the optical disc 400 shown in FIG. 3 instead of the optical disc 40 shown in FIG. 1 will be described below using the flying head shown in FIG. 1.

During recording, laser light 11 is incident to the objective lens 30 to thereby form an optical spot on the bottom of the objective lens 30. The formed optical spot becomes a small spot which is inversely proportional with a refractive index of the material of the objective lens 30. The optical spot becomes abruptly large after it comes out in the air. However, since the optical disc 400 is close to the objective lens 30, at a distance of $\lambda/10$ to $\lambda/5$, a near field is generated. Thus, the optical spot is transferred to the optical disc 400 with the size of the optical spot maintained. During reproduction, the optical spot is reflected from the reflective layer 401 coated on the outer side of the substrate 405 of the optical disc 400 shown in FIG. 3 and returned to the objective lens 30. In this case, since the lands 600 and the hills 500 of the peaked hood shape which are formed on the substrate 405 are discriminated by the reflective layer 401, tracking is possible.

In the above embodiment, the optical disc has been described with respect to a double-sided disc. However, the present invention can be applied to a single-sided disc.

As described above, the present invention includes the lands and hills on the substrate of the optical disc, to thereby facilitating disc fabrication. Accordingly, tracks of the disc can be narrowed, to thereby enhance a recording density.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disc comprising:
    a substrate having flat portions, which correspond to tracks having a width, and micro-embossments, which are track guides, protruding from surfaces of the flat portions;
    a reflective layer formed on the surfaces of the flat portions and the micro-embossments of the substrate;
    a dielectric layer formed on the reflective layer;
    a recording layer formed on the dielectric layer and having portions corresponding to the flat portions; and
    a protective layer formed on the recording layer,
    wherein the micro-embossments protrude toward the protective layer and narrow in a direction toward the protective layer.

2. The optical disc of claim 1, wherein said micro-embossments are hills of a peaked hood shape, respectively.

3. The optical disc of claim 2, wherein said hills of a respectively peaked hood shape each have a height of $\lambda/4$ from the surfaces of the flat portions, in which $\lambda$ is a wavelength of light compatible with the optical disc.

4. The optical disc of claim 1, wherein a surface of said protective layer opposite that formed on the recording layer is flat.

5. The optical disc of claim 2, wherein said protective layer has an outer surface higher than peaks of the hills.

6. The optical disc of claim 5, wherein said protective layer is transparent.

7. The optical disc of claim 1, wherein said substrate has a first side having the flat portions and the micro-embossments, said substrate further comprising a second side opposite and substantially parallel to the first side and having second flat portions and second micro-embossments, which are track guides, protruding from surfaces of the second flat portions, the optical disc further comprising:
    a second reflective layer formed on the surfaces of the second flat portions and the second micro-embossments of the second side of the substrate;

a second dielectric layer formed on the second reflective layer;

a second recording layer formed on the second dielectric layer; and a second protective layer formed on the second recording layer, wherein the second micro-embossments protrude toward the second protective layer.

8. The optical disc of claim 7, wherein said micro-embossments and the second micro-embossments are hills of the peaked hood shape, respectively.

9. The optical disc of claim 8, wherein the hills of a respectively peaked hood shape have a height of λ is a wavelength of light compatible with the optical disc.

10. The optical disc of claim 7, wherein outer surfaces of the protective layer and the second protective layer extend further from the substrate than peaks of the hills.

11. The optical disc of claim 3, wherein a thickness of said protective layer is thicker than those of said micro-embossments.

12. An optical disc comprising:

a substrate having a first surface, which corresponds to a track having a width, with first protrusions extending from the first surface, and covered by a protective layer, wherein the first protrusions are track guides for data recorded on the track and narrow toward the protective layer.

13. The optical disc of claim 12, wherein the first surface has first flat portions between the first protrusions.

14. The optical disc of claim 13, wherein the first protrusion are hills of a respectively peaked hood shape.

15. The optical disc of claim 14, wherein each hill has a height of λ/4 extending from the first flat portions, wherein λ is a wavelength of light to record and/or reproduce the data from the optical disc.

16. The optical disc of claim 12, further comprising:

a first reflective layer formed on the first surface and the first protrusions;

a first dielectric layer formed on the first reflective layer;

a first recording layer formed on the first dielectric layer; and a first protective layer formed on the first recording layer.

17. The optical disc of claim 16, wherein the first protective layer is formed further from the first surface than peaks of the first protrusions.

18. The optical disc of claim 17, wherein the first protective layer has a flat outer surface.

19. The optical disc of claim 17, wherein the recording layer has grooves corresponding to and above the protrusions, wherein the grooves have a depth substantially as a height of the protrusions.

20. The optical disc of claim 15, further comprising:

a reflective layer formed on the first surface and the protrusions;

a dielectric layer formed on the reflective layer;

a recording layer formed on the dielectric layer; and a protective layer formed on the recording layer.

21. The optical disc of claim 19, wherein the protective layer is formed further from the first surface than the peaks of the protrusions.

22. The optical disc of claim 12, further comprising:

the substrate having a second surface opposite to and substantially parallel to the first surface with second protrusions extending from the second surface.

23. The optical disc of claim 15, further comprising:

the substrate having a second surface opposite to and substantially parallel to the first surface with second protrusions extending from the second surface, the second surface having second flat portions between the second protrusions;

wherein the second protrusions are hills of a respectively peaked hood shape, each hill having a height of λ/4 extending from the second flat portions.

24. The optical disc of claim 16, further comprising:

the substrate having a second surface opposite to and substantially parallel to the first surface with second protrusions extending from the second surface;

a second reflective layer formed on the second surface and the second protrusions;

a second dielectric layer formed on the second reflective layer;

a second recording layer formed on the second dielectric layer; and a second protective layer formed on the second recording layer.

25. The optical disc of claim 24, wherein the first protective layer is formed further from the first surface than peaks of the first protrusions.

26. The optical disc of claim 24, wherein the first protective layer has a flat outer surface.

27. An optical disc which stores data, comprising:

a substrate covered by a protective layer, and having a first surface, which corresponds to a track having a width; and first protrusions extending from the first surface, wherein the first protrusions are track guides for the data and narrow in a direction toward the protective layer.

28. The optical disc of claim 27, wherein the first protrusions are integrally formed of the substrate.

29. The optical disc of claim 27, wherein the substrate has a second surface opposite and substantially parallel to the first surface, the optical disc further comprising second protrusions extending from the second surface, wherein the second protrusions are track guides for the data.

30. The optical disc of claim 28, wherein the substrate has a second surface opposite and substantially parallel to the first surface, the optical disc further comprising second protrusions extending from the second surface, wherein the second protrusions are track guides for the data and are integrally formed of the substrate.

* * * * *

UNITED STATES PATENT AND TRADEMARK OFFICE
CERTIFICATE OF CORRECTION

PATENT NO. : 6,899,937 B2
DATED : May 31, 2005
INVENTOR(S) : Yong-Hoon Lee et al.

It is certified that error appears in the above-identified patent and that said Letters Patent is hereby corrected as shown below:

Title page,
Item [56], References Cited, U.S. PATENT DOCUMENTS, insert
-- 6,165,391 12/2000 Vedamutu --.

Signed and Sealed this

Sixteenth Day of August, 2005

JON W. DUDAS
*Director of the United States Patent and Trademark Office*